(12) United States Patent
Bikumala et al.

(10) Patent No.: US 11,489,805 B2
(45) Date of Patent: Nov. 1, 2022

(54) AUTOMATED EMAIL LEGAL HOLD

(71) Applicant: Dell Products L.P., Round Rock, TX (US)

(72) Inventors: Sathish Kumar Bikumala, Round Rock, TX (US); Bijan Kumar Mohanty, Austin, TX (US); James S. Watt, Jr., Austin, TX (US)

(73) Assignee: Dell Products L.P., Round Rock, TX (US)

( * ) Notice: Subject to any disclaimer, the term of this patent is extended or adjusted under 35 U.S.C. 154(b) by 131 days.

(21) Appl. No.: 16/589,397

(22) Filed: Oct. 1, 2019

(65) Prior Publication Data

US 2021/0099412 A1 Apr. 1, 2021

(51) Int. Cl.
*H04L 51/42* (2022.01)
*G06F 16/11* (2019.01)
*H04L 51/212* (2022.01)
*H04L 51/214* (2022.01)

(52) U.S. Cl.
CPC ............ *H04L 51/42* (2022.05); *G06F 16/113* (2019.01); *G06F 16/122* (2019.01); *H04L 51/212* (2022.05); *H04L 51/214* (2022.05)

(58) Field of Classification Search
None
See application file for complete search history.

(56) References Cited

U.S. PATENT DOCUMENTS

| | | | | |
|---|---|---|---|---|
| 11,256,674 | B2* | 2/2022 | Lauriston | G01J 3/463 |
| 2007/0156694 | A1* | 7/2007 | Lim | H04L 63/20 |
| 2008/0060051 | A1* | 3/2008 | Lim | H04L 63/10 |
| | | | | 726/1 |
| 2015/0135300 | A1* | 5/2015 | Ford | H04L 63/0281 |
| | | | | 726/11 |
| 2015/0163206 | A1* | 6/2015 | McCarthy | H04L 63/06 |
| | | | | 713/171 |
| 2015/0310188 | A1* | 10/2015 | Ford | H04L 63/0428 |
| | | | | 726/28 |
| 2017/0041296 | A1* | 2/2017 | Ford | G06F 16/951 |

OTHER PUBLICATIONS

Wright et al., "IEEE Standard for Information Technology: Hardcopy Device and System Security" Jun. 30, 2008, IEEE Computer Society, IEEE Std 2600™—2008, pp. 110-116 (Year: 2008).*

* cited by examiner

*Primary Examiner* — Davoud A Zand
(74) *Attorney, Agent, or Firm* — Krishnendu Gupta; Deepika Bhayana; Derek Lam

(57) ABSTRACT

In some examples, a computing device may receive, from an email server, an email rule comprising conditions and actions and determine a subset of archived emails stored on the computing device that satisfy the conditions. The computing device may perform the actions to the subset of archived emails, such as placing a legal hold on the subset of archived emails, creating and sending copies of the subset of archived emails to the email server, or deleting, from the computing device, the subset of archived emails. After determining that a user is attempting to perform a prohibited action on (e.g., delete, edit, forward) an email of the subset of archived emails, the computing device may perform a protective action, such as logging the user out of an email account, preventing the user from logging in to the email account, automatically sending an email to an administrator or the like.

14 Claims, 5 Drawing Sheets

AUTOMATED EMAIL LEGAL HOLD

BACKGROUND OF THE INVENTION

Field of the Invention

This invention relates generally to placing a legal hold on emails in a corporate (e.g., Enterprise) environment, and more particularly to placing a hold on emails located on an email server and on archived emails stored on individual computing devices.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information technology department of a corporation, such as a technology company, may be asked to assist with enforcing a legal hold on information, such as employee emails, that include information that may be related to a legal matter, such as litigation that involves the corporation. A legal hold that is applied to an email server may only be applied to emails stored on the email server and may not be applied to emails archived and stored on individual user's computing devices.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a computing device may receive, from an email server, an email rule comprising (i) one or more conditions and (ii) one or more actions. The computing device may compare the one or more conditions with individual archived emails of a plurality of archived emails stored on the computing device to identify a subset of the plurality of archived emails that satisfy the one or more conditions of the email rule. For example, comparing the one or more conditions with the individual archived emails stored on the computing device may include: (i) comparing the one or more conditions with metadata associated with the individual archived emails of the plurality of archived emails stored on the computing device and (ii) comparing the one or more conditions with multiple fields of the individual archived emails of the plurality of archived emails stored on the computing device. The multiple fields may include a sender email address, one or more recipient email addresses, a subject field, and a body field. The computing device may perform the one or more actions specified in the email rule to the subset of the plurality of archived emails. For example, the one or more actions may include (i) placing a legal hold on the subset of the plurality of archived emails, (ii) creating copies of the subset of the plurality of archived emails, (iii) sending the copies to the email server, (iv) deleting, from the computing device, the subset of the plurality of archived emails or the like. The computing device may determine that a user is attempting to perform a prohibited action on (e.g., attempting to delete, edit, forward, or the like) at least one email of the subset of the plurality of archived emails and perform a protective action. The protective action may include at least one of: logging the user out of an email account associated with the user and preventing the user from logging back into the email account associated with the user, automatically sending an email to an administrator in a legal department or an information technology department of a company, or the like.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
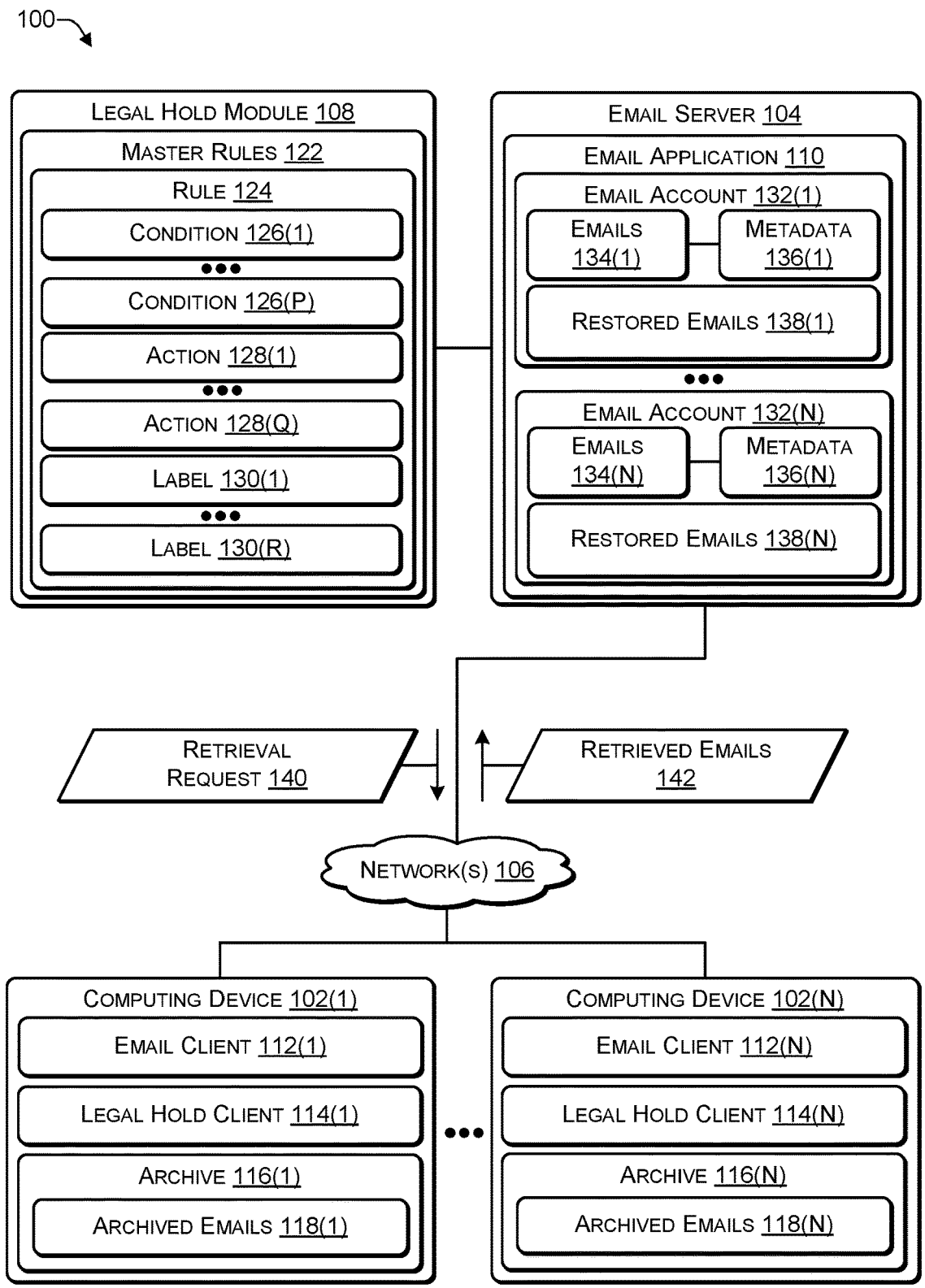
FIG. 1 is a block diagram of a system that includes a legal hold module associated with an email server, according to some embodiments.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein enable a legal hold to be placed on emails located on an email server as well as enabling the retrieval of emails subject to the legal hold that have been archived on individual computing devices. For example, a central email server may host an email service application, such as Microsoft Exchange. The email server may limit a size of each user's inbox, resulting in users archiving emails locally, e.g., on each user's computing device. For example, the email server may limit each user may to an inbox of 1 gigabyte (GB) or less in size, causing each user to archive emails locally, on the user's computing device. The systems and techniques described herein may use local email clients (e.g., Outlook or similar), an email server (MS Exchange or similar), and server plugins or add-ins that enable 3rd party code to be executed on server and client devices. By leveraging the add-in or plug-in capabilities of email systems, the systems and techniques described herein extend the functionality of email and server applications to enhance implementing a legal hold on emails. The systems and techniques may use the search and filter capabilities of the email systems to identify emails that include conversations associated with a particular topic or subject, people who sent the emails, people who received the emails, people who were copied (or blind copied) on the emails, or any combination thereof.

The systems and techniques may provide several capabilities, including, for example (i) enabling a legal department or information technology (IT) department to place legal holds on emails matching particular criteria, (ii) enabling emails that are unavailable on the server to be restored using an archived copy stored on a user's computing device, (iii) enabling emails that meet particular criteria (e.g., related to a particular topic, send by a particular user, sent to a particular user, having a particular user copied on the email) to be flagged, on both the server side and on the client side, as being under legal hold to prevent unauthorized user actions (e.g., deletion, editing, forwarding, and the like) on the flagged emails, and (iv) enabling an action (e.g., delete, forward, or the like) to be performed on emails meeting particular criteria on the client side or the server.

The systems and techniques may be added as a plug-in (e.g., add-in) to an existing email system to provide the capabilities to enable/disable legal holds on emails quickly and comprehensively throughout an email system. The plug-in may include a first component that resides on the email server and a second component that resides with each email client (e.g., on each user's computing device). The controls for legal hold may be implemented similar to email search and filter criteria, including whitelisting rules and blacklisting rules. For example, a search may be conducted for "emails from John Doe, between Jan. 1, 2017 and Jan. 1, 2018, to any_user@rival_company.com". The results of such a query could be subject to a legal hold. In addition, particular emails may be manually marked as relevant or exempt (e.g., irrelevant).

The systems and techniques may provide the ability to restore emails that are currently unavailable on the server by identifying and restoring emails archived on individual computing devices. For example, searching the email server itself may only provide a partial view into email content, so the systems and techniques provide client-side capability for executing legal hold queries against local inboxes and local archive files. To illustrate, the search for "emails from John Doe, between Jan. 1, 2017 and Jan. 1, 2018, to any_user@rival_company.com" may return no results on the server due to the time period (e.g., email age) specified in the query. By sending and executing the same query on the client-side using a client-based add-in, the archived emails of each user in the email system may be searched and emails that match the query identified and recovered from the client-based email archives. Thus, for emails that match the query, the add-in restores to the email server the matching emails from the archives of each client.

Not only does the client-based add-in provide the capability to restore emails that were not available on the email server but the client-based add-in enables emails stored on the user's computing device to be subject to a legal hold, thereby preventing the user from performing particular actions (e.g., deleting, editing, forwarding, or the like) on an archived email that matches the query. The system and techniques enable particular actions to be prohibited from being performed on emails that have been flagged as matching particular criteria (e.g., sent by a particular user, sent to a particular user, having a subject that includes a particular topic, and the like), on both the client and the server side. For example, the legal hold may specify particular actions a user can perform on a flagged email and particular prohibited actions the user cannot perform on a flagged email. In addition, the legal hold may specify particular preventative actions that the email client may automatically perform if the user attempts to perform one of the prohibited actions on a flagged email. For example, if the user attempts to delete a flagged email, the email client may automatically perform one or more preventative actions, such as, for example, locking out the user (e.g., logging out the user and preventing the user from logging back into the email client), sending an email to a designated representative (e.g., an IT administrator or a legal representative) indicating that an attempt was made to perform a prohibited action on a flagged email, or the like. The client-side rules may be different than the server-side rules and may be customized for each user, for each query, and the like.

The systems and techniques described herein may enable a particular action (e.g., archiving, deletion, or the like) to be performed (e.g., forced) onto emails matching particular criteria. For example, a legal department may desire to prohibit information included in emails under legal hold from being shared to prevent the spread of unauthorized information. To achieve this, the emails matching particular criteria may be deleted from client devices and deleted from the server.

The systems and techniques may enable rules for a legal hold to be entered. For example, a rule may include an email query to identify email conversations (e.g., all emails in an email chain, including replies, forwards, and the like) related to the hold. Multiple queries may be combined using Boolean logic (and, or, and the like). A rule may include one or more action(s) to be performed to matching email conversations. Actions may include, for example, delete, hold, flag, copy, forward, enforce server replication, and the like. Actions associated with rules may be customizable to affect specific user inboxes, e.g., the actions may vary based on the user. The actions may be configurable to enable each action to be assigned a priority and an order of operation. For example, (i) send emails stored in an archive that match a query from a client device to a server and then (ii) delete the emails from the archive. Rules may be propagated through the email system via the server-side add-in and the client-side add-ins.

As an example, a computing device may include one or more processors and one or more non-transitory computer-readable media storing instructions executable by the one or more processors to perform various operations. The operations may include receiving, from an email server, an email rule comprising (i) one or more conditions and (ii) one or more actions. The operations may include comparing the one or more conditions with individual archived emails of a plurality of archived emails stored on the computing device and identifying a subset of the plurality of archived emails that satisfy the one or more conditions. For example, comparing the one or more conditions with the individual archived emails of the plurality of archived emails stored on the computing device may include: (i) comparing the one or more conditions with metadata associated with the individual archived emails of the plurality of archived emails stored on the computing device, and (ii) comparing the one or more conditions with multiple fields of the individual archived emails of the plurality of archived emails stored on the computing device. The multiple fields may include a sender email address, one or more recipient email addresses, a subject field, and a body field. The operations may include performing the one or more actions on the subset of the plurality of archived emails. For example, the one or more actions may include (i) placing a legal hold on the subset of the plurality of archived emails, (ii) creating copies of the subset of the plurality of archived emails, (iii) sending the copies to the email server, (iv) deleting, from the computing device, the subset of the plurality of archived emails or the like. The operations may include determining that a user is attempting to perform a prohibited action on (e.g., attempting to delete, edit, forward) at least one email of the subset of the plurality of archived emails and performing a protective action. The protective action may include at least one of: logging the user out of an email account associated with the user and preventing the user from logging back into the email account associated with the user, automatically sending an email to an administrator in a legal department or an information technology department of a company, or the like.

FIG. 1 is a block diagram of a system 100 that includes a legal hold module associated with an email server, according to some embodiments. The system 100 includes multiple computing devices 102(1) to 102(N) (N>0) coupled to an email server 104 via one or more networks 106. A legal hold (server-based) module 108 may be an add-in (e.g., a software application that supplements another application) to an email application 110 (e.g., Microsoft® Exchange or the like) executing on the email server 104. The legal hold module 108 may provide a user interface (UI) to enable a legal department or an information technology (IT) department to place a legal hold on emails that match particular criteria on the email server 104 and on each of the computing devices 102. The email application 110 may host multiple email accounts, such as an email account 132(1) to 132(N).

An email client may be installed on each of the computing devices 102(1) to 102(N). For example, an email client 112(1) (e.g., to access the email account 132(1)) may be installed on the computing device 102(1) and an email client 112(N) (e.g., to access the email account 132(N)) may be installed on the computing device 102(N). A legal hold client (module) 114(1) may be a plug-in module to the email client 112(1) and a legal hold client (module) 114(N) may be a plug-in module to the email client 112(N). Each of the computing devices 102 may include an archive to store archived emails to enable a size of the emails in the email accounts 132 to be kept below a particular threshold (e.g., 1 megabyte (MB), 2 MB, or another size limit). For example, the computing device 102(1) may include an archive 116(1) to store one or more archived emails 118(1) and the computing device 102(N) may include an archive 116(N) to store one or more archived emails 118(N). The archived emails 118 may not be available on the email server 104. For example, conducting a search or applying the rule 124 to the email server 104 may only search the emails 134 hosted by the email server 104.

A user of a computing device, such as the computing device 102(N), may access multiple email accounts. For example, the user may use the email client 112(N) to access the corporate email account 132(N) and to access one or more personal email accounts (e.g., gmail account, yahoo email account, Hotmail, or another personal account). The legal hold client 114(N) may, in addition to searching the archived emails 118(N), search the personal email accounts to identify emails matching the conditions 126 in the rule 124. In this way, the legal hold client 114(N) is able to access all email accounts, including corporate email accounts and personal email accounts, that the user accesses using the computing device 102(N).

The legal hold module 108 may provide a UI to enable personnel from a legal or an IT department to enter one or more master rules 122 to place a legal hold on a subset of emails on the email server 104 and on each of the computing devices 102. For example, a representative rule 124 may include one or more conditions 126(1) to 126(P) (P>0). The conditions 126 may be used to filter emails and may be applied to various email fields and various tags and flags, as described in more detail in FIG. 2. Each of the master rules 122, such as the rule 124, may include one or more actions 128(1) to 128(Q) (Q>0) to be performed to emails satisfying one or more of the conditions 126. Each of the master rules 122, such as the rule 124, may include one or more labels 130(1) to 130(R) to be applied to emails satisfying one or more of the conditions 126. Each email account 132 may include one or more emails 134, with each email having associated metadata 136. For example, the email account 132(1) may include emails 134(1) and associated metadata 136(1) and the email account 132(N) may include emails 134(N) and associated metadata 136(N).

The conditions 126 may specify an email sender (e.g., the "From" field of an email), one or email recipients (e.g., from the "To", "CC", or "BCC" fields of an email), a topic (e.g., the "Subject" field or in a body of an email), zero or more labels (e.g., tags, flags or other information stored in metadata associated with an email), and other email-related information. Each of the conditions 126 may be used with Boolean operators such as "AND", "OR", "NOT", "AND NOT". For example, an email hold may be applied to the emails 134 satisfying conditions sender=X AND subject=Y and NOT subject=Z. The actions 128 may include delete, hold, prevent deletion, prevent forwarding, prevent editing, retrieve to server (e.g., send a copy of an email from one of the archives 116 to the email server 104), and the like. The actions 128 may include preventative actions. For example, if a user attempts to perform a prohibited action (e.g., delete, edit, forward) then the email application 110, the email clients 112, or both may perform a preventative action, such as automatically (e.g., without human interaction) locking out the user from the user's email account (e.g., one of the email accounts 132), automatically sending an email to notify someone in the legal or IT department, automatically sending a copy of the email from the computing device to the server and deleting the email from the computing device to prevent further tampering, or another preventative action. The labels 130 may indicate, in metadata associated with an email, that a hold has been placed on the email, actions a user is prohibited from performing on the email, preventative action(s) to perform if the user attempts to perform a prohibited action, and other information related to the hold. For example, if the legal department is concerned that there may be potential for a lawsuit or that someone may be leaking sensitive information to a competitor, the legal department may proactively create a rule to flag emails that include a particular keyword in the subject or a body of the email. Emails that match the criteria in the rule may be flagged and, in some cases, a copy of the email sent to an IT or legal administrator.

The legal hold module 108 may (i) enable a legal department or IT department to place legal holds on the emails 134 matching conditions 126, (ii) enable emails that are unavailable on the email server 104 to be retrieved by sending a retrieval request 140 (e.g., including a rule, such as the rule 124), causing the legal hold clients 114 to search the archives 116 to identify matching emails (e.g., a subset of the archived emails 118 that match the conditions 126 of the rule 124) and to send retrieved emails 142 from the archives 116 for storage on the email server 104 as restored emails 138, (iii) enable emails that meet the specified conditions 126 as being under legal hold to prevent unauthorized user actions (e.g., deletion, editing, forwarding, and the like) on the flagged emails, and (iv) enable one or more of the actions 128 (e.g., delete, forward, or the like) to be performed on the emails 134 on the email server 104 and the archived emails 118 on the computing devices 102 that meet the conditions 126. Thus, the legal hold module 108 may apply holds to the emails 134 on the email server 104 and the legal hold clients 114 may apply holds to the archived emails 118 stored on each of the computing devices 102.

The legal hold module 108 may perform a search of the emails 134 accessible to the email server 104 and send the retrieval request 140 to the legal hold clients 114 on each of the computing devices 102 to search the archived emails 118 stored on each of the computing devices 102. The retrieval request 140 may include one or more of the master rules 122, such as the representative rule 124. The legal hold module 108 may place a hold on emails that are identified as a result of the searches performed on the emails 134 and the archived emails 118. The legal hold clients 114 on each of the computing devices 102 may send the retrieved emails 142 to the email server 104. The email server 104 may store the retrieved emails 142 as the restored emails 138. Thus, the legal hold module 108 provides the ability to create the restored emails 138 that were unavailable on the email server 104 from the archived emails 118 on individual computing devices 102. By sending and executing the same query on the client-side using the legal hold clients 114, the archived emails 118 of each of the email accounts 132 may be identified and recovered to create the restored emails 138.

The emails 134 on the email server 104 and the archived emails 118 on each of the computing devices 102 may thus be subject to a hold based on the master rules 122. The legal hold clients 114 provides the capability to restore emails that were not available on the email server 104. In addition, the legal hold clients 114 enable the archived emails 118 stored on the computing devices 102 to be subject to a legal hold, thereby preventing the user from performing particular actions (e.g., deleting, editing, forwarding, or the like) on the archived emails 118 that match any of the master rules 122. The rule 124 enables a user to be prohibited from being able to perform particular actions 128 on emails that match any of the master rules 122, on both the client side and on the server side. For example, the rule 124 may specify particular actions 128 a user can perform and particular actions 128 the user is prohibited from performing on emails 134 and archived emails 118 matching the conditions 126 in the rule 124. In addition, the actions 128 may include preventative actions that the email clients 112 may automatically perform if the user attempts to perform one of the prohibited actions on a flagged email in the archived emails 118. For example, if the user attempts to delete a flagged email, the email client 112 may automatically perform one or more preventative actions 128, such as, for example, locking out the user (e.g., logging out the user from one of the email accounts 132 and preventing the user from logging back in using the email client 112), sending an email to a designated representative (e.g., an IT administrator or a legal representative) indicating that an attempt was made to perform a prohibited action on a flagged email, or the like. The master rules 122 may include client-side rules (of the master rules 122) enforced by the email client 112 on the archived emails 118 and server-side rules (of the master rules 122) enforced by the legal hold module 108 on the emails 134.

The master rules 122, such as the representative rule 124, may enable the actions 128 (e.g., archiving, deletion, or the like) to be performed (e.g., forced) onto emails (e.g., the emails 134 and the archived emails 118) matching the conditions 126. For example, a legal department may desire to prohibit information included in emails under legal hold from being shared to prevent the spread of unauthorized information. To achieve this, the emails 134 and the archived emails 118 matching the conditions 126 (e.g., subject or body of email include X or Y) may be flagged to prevent forwarding.

The rule 124 may include conditions 126 (e.g., similar to an email query) to identify email conversations (e.g., all emails in an email chain, including original email, replies, forwards, and the like) related to the hold. Multiple queries may be combined using Boolean logic (AND, OR, NOT, AND NOT, and the like). The rules 124 may include one or more action(s) 128 to be performed to matching email conversations. The actions 128 may include, for example, delete, hold, flag, copy, forward, enforce server replication, and the like. The actions 128 may be customizable to affect specific user inboxes, e.g., the actions 128 may vary based on the user. The actions 128 may be configurable to enable each of the actions 128 to be assigned a priority and an order of operation (e.g., an order in which the actions 128 are performed). For example, the actions 128 may specify to (i) send emails stored in an archive that match a query from a client device to a server and then (ii) delete the emails from the archive. The master rules 122 may be propagated through the email system via the server-side legal hold module 108 and the client-side legal hold clients 114.

Thus, a legal hold module may include a server-side add-in that interfaces with an email application (e.g., Microsoft Exchange) on an email server and multiple legal hold clients that interface with email clients (e.g., Microsoft Outlook) on individual computing devices. A legal department or IT department can specify conditions that, when satisfied, cause one or more actions to be performed to the emails (both emails accessible to the email server and to archived emails stored on individual computing devices)

satisfying the conditions. The archived emails that satisfy the conditions may be retrieved from individual computing devices and sent to the email server to enable all emails satisfying the conditions to be available on the email server. The emails that satisfy the conditions may be labeled as having a legal hold. The actions may include preventing a user from performing particular actions, such as, for example, preventing a user from forwarding, deleting, or editing emails that satisfy the conditions and have been labeled as having a legal hold.

Figure 2:
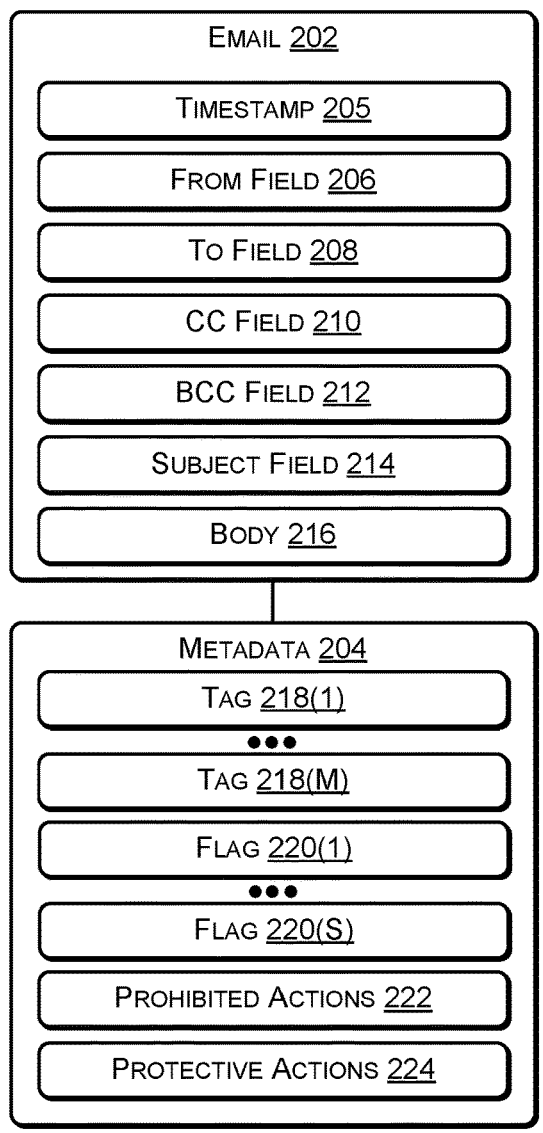
FIG. 2 is a block diagram illustrating contents of an email, according to some embodiments.

FIG. 2 is a block diagram 200 illustrating contents of an email, according to some embodiments. An email 202 (e.g., one of the emails 124, the archived emails 118, or the restored emails 138) may have associated metadata 204 (one of the metadata 136). The rule 124 of FIG. 1 may include the conditions 126 associated with one or more of the fields of the email 202 and the contents of the metadata 204.

The email 202 may include various fields, such as, for example, a timestamp filed 205 (e.g., indicating when the email 202 was sent), a from field 206 (identifying a sender of the email 202), a to field 208 (identifying recipient(s) of the email 202), a carbon copy (cc) field 210 (identifying additional recipient(s) of the email 202), a blind cc (bcc) field 212 (identifying additional recipient(s) of the email 202), a subject field 214 identifying a topic of the email 202, and a body 216 of the email 202 that includes the content of the email 202. The timestamp 205 may enable emails sent during a particular time period (e.g., between a start date and time and an end date and time) to be specified using the conditions 126 of FIG. 1.

The metadata 204 may include tags 218(1) to 218(M) (M>0), flags 220(1) to 220(S) (S>0), prohibited actions 222, and protective actions 224. The tags 218 may enable the legal hold module 108 and the legal hold client 112 to associate a tag, such as "product X" or "member of team Y" or the like with the email 202. The flags 220 may enable the legal hold module 108 and the legal hold client 112 to associate a flag, such as "legal hold" or the like with the email 202. The prohibited actions 222 may identify one or more actions that a user is prohibited from performing to the email 202, such as, for example, prohibited from deleting, prohibited from editing, prohibited from forwarding, and the like. The protective actions 224 may identify one or more protective actions that the legal hold module 108 and/or the legal hold client 112 may undertake if the user attempts to perform one of the prohibited actions 222. For example, the protective actions 224 may include logging the user out from the user's email client 112, preventing the user from logging in to the user's email client 112, preventing the user from accessing the user's email account 132, preventing the user from accessing the archived emails 118, automatically sending an email to someone in the IT or legal department notifying them that the user attempted to perform the prohibited action, another action, or any combination thereof.

Figure 3:
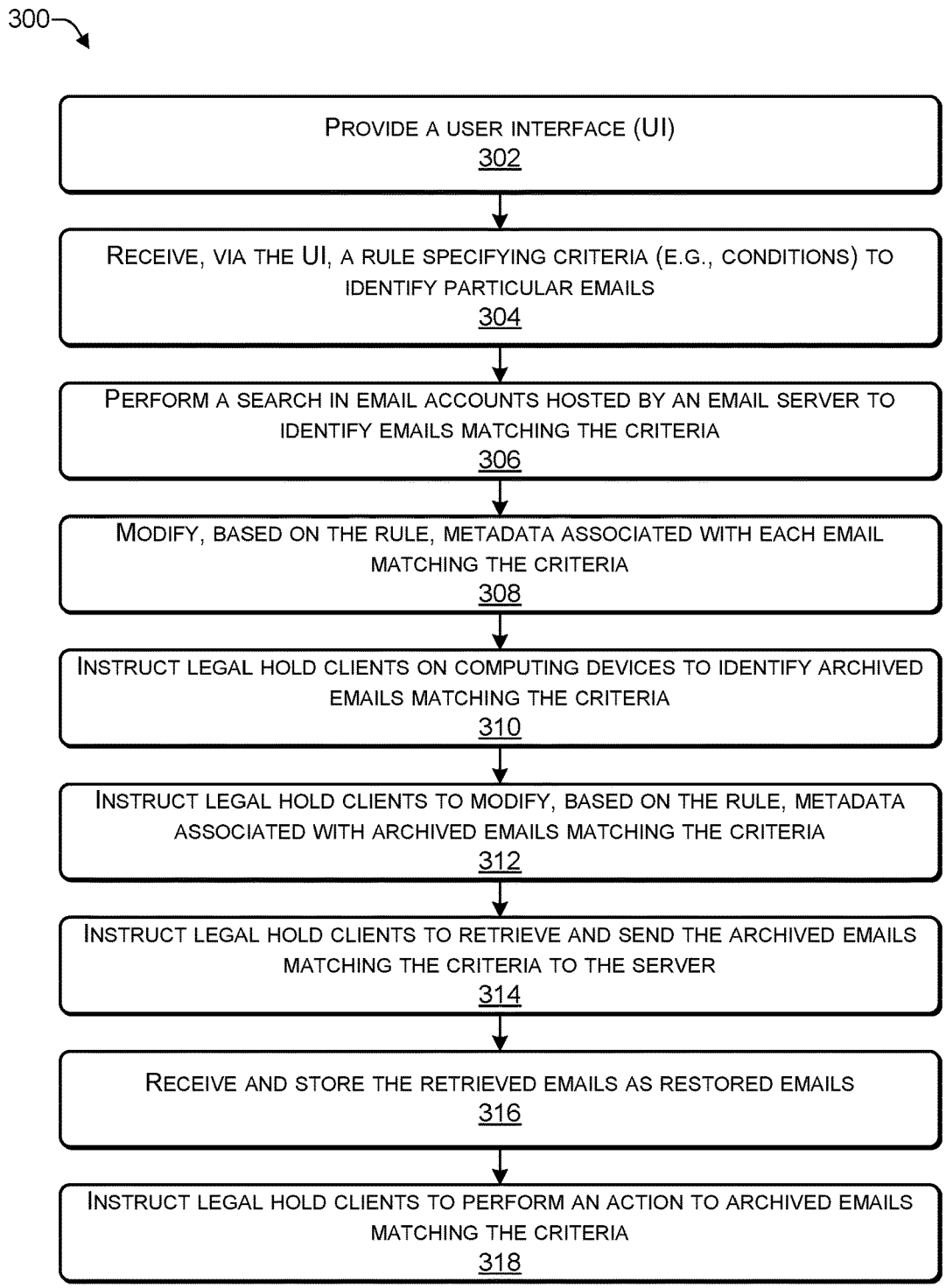
FIG. 3 is a flowchart of a process that includes providing a user interface to enable a legal hold on emails, according to some embodiments.
Figure 4:
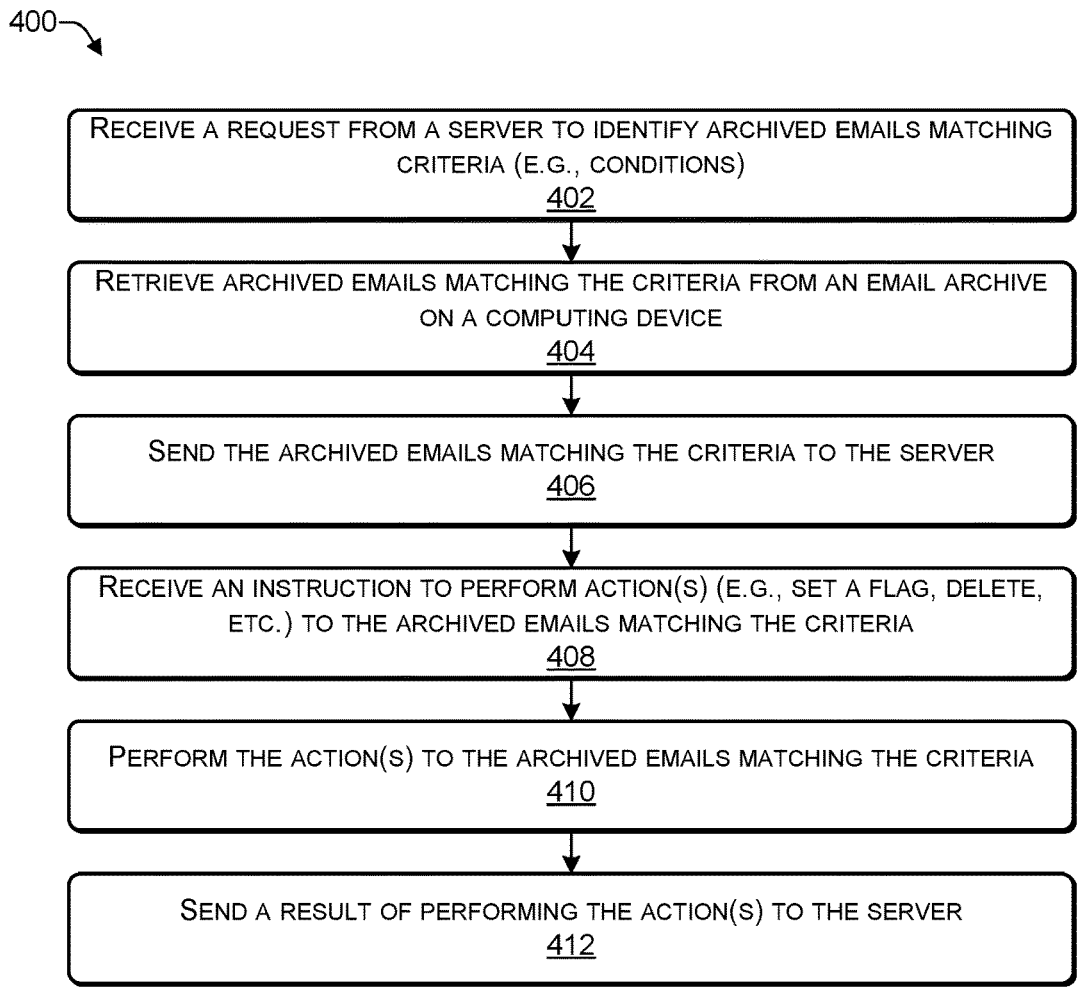
FIG. 4 is a flowchart of a process that includes receiving a request from a server to perform one or more actions related to a legal hold, according to some embodiments.

In the flow diagram of FIGS. 3 and 4, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 300 and 400 are described with reference to FIGS. 1 and 2, as described above, although other models, frameworks, systems and environments may be used to implement these processes.

FIG. 3 is a flowchart of a process 300 that includes providing a user interface to enable a legal hold on emails, according to some embodiments. For example, the process 300 may be performed by the legal hold module 108 of FIG. 1, the legal hold clients 114, or a combination of both.

At 302, the process may provide a user interface (UI). At 304, the process may receive, via the UI, a rule specifying criteria (e.g., one or more conditions) to identify particular emails. At 306, the process may search emails in email accounts hosted by an email server to identify emails matching the criteria. At 308, the process may modify, based on the rule, metadata associated with the email. For example, in FIG. 1, the legal hold module 108 may provide a UI to enable personnel from a legal or an IT department to enter one or more master rules 122 to place a legal hold on a subset of emails on the email server 104 and on each of the computing devices 102. For example, the representative rule 124 may include one or more conditions 126(1) to 126(P) (P>0). The conditions 126 may be used to filter emails and may be applied to various email fields and various tags and flags, as described in more detail in FIG. 2. Each of the master rules 122, such as the rule 124, may include one or more actions 128(1) to 128(Q) (Q>0) to be performed to emails satisfying one or more of the conditions 126. Each of the master rules 122, such as the rule 124, may include one or more labels 130(1) to 130(R) to be applied to emails satisfying one or more of the conditions 126. The conditions 126 may specify an email sender (e.g., the "From" field of an email), one or email recipients (e.g., from the "To", "CC", or "BCC" fields of an email), a topic (e.g., the "Subject" field or in a body of an email), zero or more labels (e.g., tags, flags or other information stored in metadata associated with an email), and other email-related information. Each of the conditions 126 may be used with Boolean operators such as "AND", "OR", "NOT", "AND NOT". For example, an email hold flag may be applied to the metadata 136 associated with emails 134 satisfying conditions sender=X AND subject=Y and NOT subject=Z.

At 310, the process may instruct legal hold clients on computing devices to identify archived emails matching the criteria. At 312, the process may instruct the legal hold clients to modify, based on the rule, metadata associated with the archived emails that match the criteria. For example, in FIG. 1, the legal hold module 108 may enable a legal department or IT department to place legal holds on the emails 134 matching conditions 126 and enable emails that are unavailable on the email server 104 to be retrieved by sending a retrieval request 140, causing the legal hold clients 114 to search the archives 116 to identify matching emails. For example, the legal hold module 108 may perform a search of the emails 134 accessible to the email server 104 and send the retrieval request 140 to the legal hold clients 114 on each of the computing devices 102 to search the archived emails 118 stored on each of the computing devices 102. The legal hold module 108 may place a hold on emails that are identified as a result of the searches performed on the emails 134 and the archived emails 118.

At 314, the process may instruct the legal hold clients to retrieve and send the archived emails matching the criteria to the server. At 316, the process may receive and store the retrieved emails as restored emails. For example, in FIG. 1, the legal hold module 108 may perform a search of the emails 134 accessible to the email server 104 and send the retrieval request 140 to the legal hold clients 114 on each of the computing devices 102 to search the archived emails 118 stored on each of the computing devices 102. The legal hold module 108 may place a hold on emails that are identified as a result of the searches performed (e.g., applying the rule 124) on the emails 134 and the archived emails 118. The legal hold clients 114 on each of the computing devices 102 may send the retrieved emails 142 to the email server 104. The email server 104 may store the retrieved emails 142 as the restored emails 138. In this way, the archived emails 118 that match the rule 124 may be restored to the email server 104.

At 318, the process may instruct the legal hold clients to perform an action to the archived emails that match the criteria. For example, in FIG. 1, the master rules 122, such as the representative rule 124, may enable the actions 128 (e.g., archiving, deletion, or the like) to be performed (e.g., forced) onto emails (e.g., the emails 134 and the archived emails 118) matching the conditions 126. For example, a legal department may desire to prohibit information included in emails under legal hold from being shared to prevent the spread of unauthorized information. To achieve this, the emails 134 and the archived emails 118 matching the conditions 126 (e.g., subject or body of email include product X) may be deleted (or flagged) to prevent forwarding.

Thus, a legal hold module may provide a UI to enable a legal department or IT department to specify conditions (e.g., criteria) that, when satisfied, cause one or more actions to be performed to the emails (both emails accessible to the email server and to archived emails stored on individual computing devices) satisfying the conditions. The archived emails that satisfy the conditions may be retrieved from individual computing devices and sent to the email server to enable all emails satisfying the conditions to be available on the email server. The emails that satisfy the conditions may be labeled as having a legal hold. The actions may include preventing a user from performing particular actions, such as, for example, preventing a user from forwarding, deleting, or editing emails that satisfy the conditions and have been labeled as having a legal hold.

FIG. 4 is a flowchart of a process 400 that includes receiving a request from a server to perform one or more actions related to a legal hold, according to some embodiments. The process 400 may be performed by the legal hold clients 114 of FIG. 1.

At 402, the process may receive a request from a server to identify emails matching one or more conditions (e.g., criteria). At 404, the process may retrieve, from an archive on a computing device, archived emails matching the criteria. At 406, the archived emails matching the criteria may be sent to the server. For example, in FIG. 1, the legal hold module 108 may perform a search of the emails 134 accessible to the email server 104 and send the retrieval request 140 to the legal hold clients 114 on each of the computing devices 102 to search the archived emails 118 stored on each of the computing devices 102. The legal hold module 108 and the legal hold clients 114 may place a hold on emails that are identified as matching the conditions 126 in the rule 124. The legal hold clients 114 on each of the computing devices 102 may send the retrieved emails 142 to the email server 104. The email server 104 may store the retrieved emails 142 as the restored emails 138.

At 408, the process may receive an instruction (e.g., from the server) to perform one or more actions to the archived emails matching the criteria. At 410, the process may perform the action(s) to the archived emails matching the criteria. At 412, the process may send a result of performing the action(s) to the server. For example, after the rule 124 has been defined, the legal hold module 108 may instruct the legal hold clients 114 to apply the rule 124 to the archived emails 118. For example, one or more of the actions 128 may be performed to the archived emails 118 that match the conditions 126. A result of performing the actions 128 to the archived emails 118 that match the conditions 126 may be sent by one or more of the legal hold clients 114 to the legal hold module 108. For example, the result may indicate how many of the archived emails 118 satisfied the conditions 126, how many of the archived emails 118 to which the actions 128 were performed. To illustrate, the result may indicate that 100 emails matched the conditions 126 and that the actions 128 (e.g., marking the 100 emails as having a legal hold, deleting the 100 emails, or the like) were successfully performed on the 100 emails.

Figure 5:
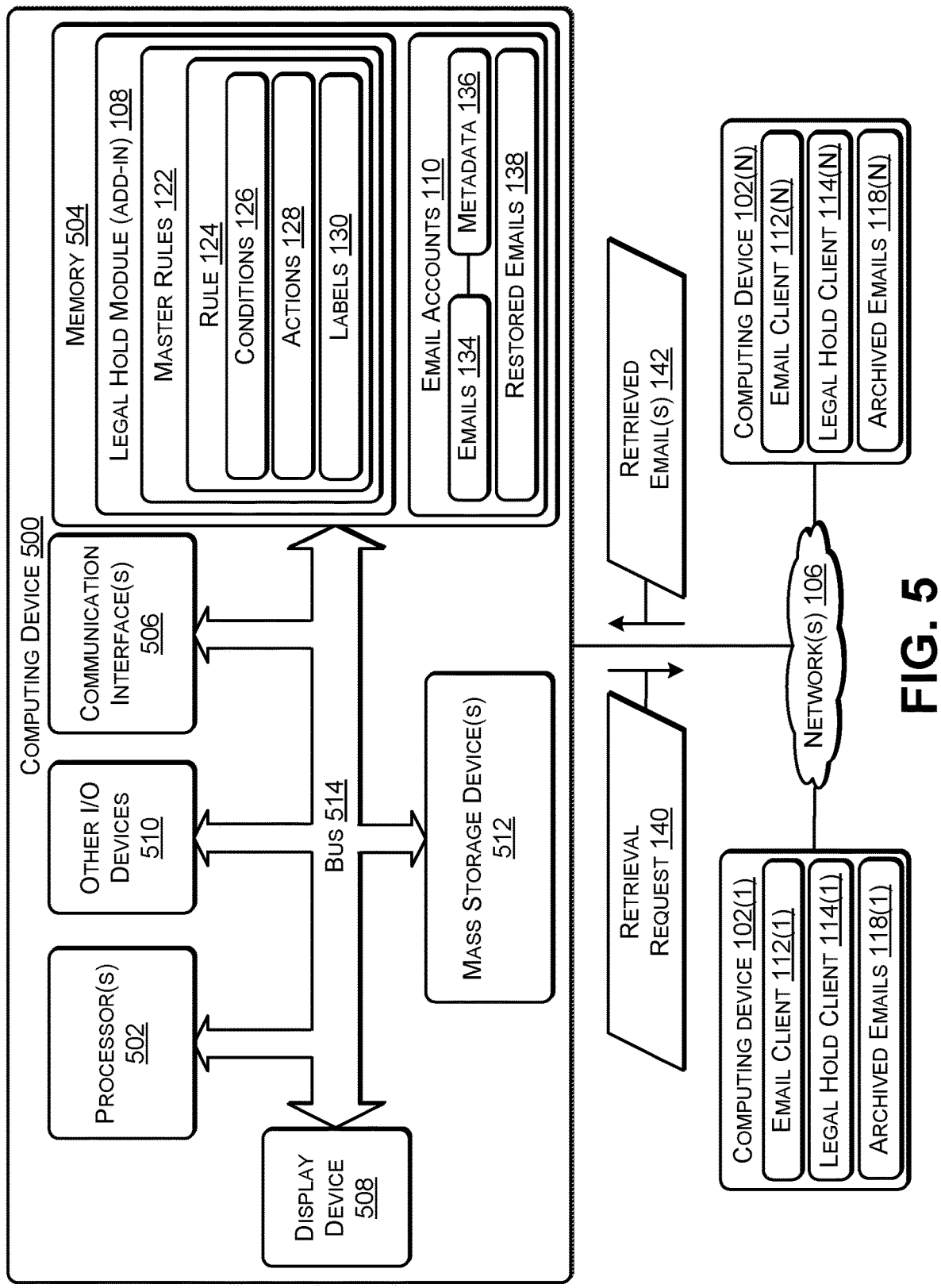
FIG. 5 illustrates an example configuration of a computing device that can be used to implement the systems and techniques described herein.

FIG. 5 illustrates an example configuration of a computing device 500 that can be used to implement the systems and techniques described herein, such as for example, the computing devices 102 and the server 104 of FIG. 1. For illustration purposes, the computing device 500 is illustrated in FIG. 5 as implementing the server 104 of FIG. 1.

The computing device 500 may include one or more processors 502 (e.g., CPU, GPU, or the like), a memory 504, communication interfaces 506, a display device 508, other input/output (I/O) devices 510 (e.g., keyboard, trackball, and the like), the sensors 206, and one or more mass storage devices 512 (e.g., disk drive, solid state disk drive, or the like), configured to communicate with each other, such as via one or more system buses 514 or other suitable connections. While a single system bus 514 is illustrated for ease of understanding, it should be understood that the system buses 514 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 502 are one or more hardware devices that may include a single processing unit or a number of processing units, all of which may include single or multiple computing units or multiple cores. The processors 502 may include a graphics processing unit (GPU) that is integrated into the CPU or the GPU may be a separate processor device from the CPU. The processors 502 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 502 may be configured to fetch and execute computer-readable instructions stored in the memory 504, mass storage devices 512, or other computer-readable media.

Memory 504 and mass storage devices 512 are examples of computer storage media (e.g., memory storage devices) for storing instructions that can be executed by the processors 502 to perform the various functions described herein. For example, memory 504 may include both volatile memory and non-volatile memory (e.g., RAM, ROM, or the like) devices. Further, mass storage devices 512 may include hard disk drives, solid-state drives, removable media, including external and removable drives, memory cards, flash memory, floppy disks, optical disks (e.g., CD, DVD), a storage array, a network attached storage, a storage area network, or the like. Both memory 504 and mass storage devices 512 may be collectively referred to as memory or computer storage media herein and may be any type of non-transitory media capable of storing computer-readable, processor-executable program instructions as computer program code that can be executed by the processors 502 as a particular machine configured for carrying out the operations and functions described in the implementations herein.

The computing device 500 may include one or more communication interfaces 506 for exchanging data via the network 106. The communication interfaces 506 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 506 can also provide communication with external storage, such as a storage array, network attached storage, storage area network, cloud storage, or the like.

The display device 508 may be used for displaying content (e.g., information and images) to users. Other I/O devices 510 may be devices that receive various inputs from a user and provide various outputs to the user, and may include a keyboard, a touchpad, a mouse, a printer, audio input/output devices, and so forth.

The computer storage media, such as memory 504 and mass storage devices 512, may be used to store software and data, as illustrated in FIG. 5. The legal hold module 108 may include the server-side add-in 108 that interfaces with an email application (e.g., Microsoft Exchange) on an email server and multiple legal hold clients 114 that interface with email clients 112 (e.g., Microsoft Outlook) on individual computing devices 102. A legal department or IT department can specify conditions 126 that, when satisfied, cause one or more actions 128 to be performed to the matching emails (both emails 134 accessible to the email server and to archived emails 118 stored on individual computing devices 102). The archived emails 118 that satisfy the conditions 126 may be retrieved from individual computing devices 102 and sent to the email server 500 to enable all emails satisfying the conditions to be available on the email server 500. The emails 134, 118 that satisfy the conditions 126 may be labeled as having a legal hold. The actions 128 may include preventing a user from performing particular actions, such as, for example, preventing a user from forwarding, deleting, or editing emails that satisfy the conditions and have been labeled as having a legal hold.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   receiving, by one or more processors of a computing device and from an email server, an email rule comprising one or more conditions and one or more actions;
   comparing, by the one or more processors, the one or more conditions with individual archived emails of a plurality of archived emails stored on the computing device;
   identifying, by the one or more processors, a subset of the plurality of archived emails that satisfy the one or more conditions;
   restoring the subset of the plurality of archived emails to the email server;
   performing, by the one or more processors, the one or more actions on the subset of the plurality of archived emails that were restored to the server, wherein the one or more actions include placing a legal hold on the subset of the plurality of archived emails;
   determining that a user is attempting to perform a prohibited action on at least one email of the subset of the plurality of archived emails; and performing a protective action; and
   wherein the protective action comprises logging the user out of an email account associated with the user and preventing the user from logging back into the email account associated with the user; and automatically sending an email to an administrator in a legal department or an information technology department of a company.

2. The method of claim 1, wherein comparing the one or more conditions with the individual archived emails of the plurality of archived emails stored on the computing device comprises:
   comparing the one or more conditions with metadata associated with the individual archived emails of the plurality of archived emails stored on the computing device; and
   comparing the one or more conditions with multiple fields of the individual archived emails of the plurality of archived emails stored on the computing device, wherein the multiple fields include a sender email address, one or more recipient email addresses, a subject field, and a body field.

3. The method of claim 1, further comprising:
creating copies of the subset of the plurality of archived emails; and
sending the copies from the computing device to the email server.

4. The method of claim 1, further comprising:
deleting, from the computing device, the subset of the plurality of archived emails.

5. The method of claim 1, wherein the prohibited action comprises at least one of: delete the at least one email; forward the at least one email; or edit the at least one email.

6. A computing device comprising: one or more processors; and one or more non-transitory computer readable media storing instructions executable by the one or more processors to perform operations comprising: receiving, from an email server, an email rule comprising one or more conditions and one or more actions; comparing the one or more conditions with individual archived emails of a plurality of archived emails stored on the computing device; identifying a subset of the plurality of archived emails that satisfy the one or more conditions; restoring the subset of the plurality of archived emails to the email server; and performing the one or more actions on the subset of the plurality of archived emails that were restored to the server, wherein the one or more actions include placing a legal hold on the subset of the plurality of archived emails;
the operations further comprising: determining that a user is attempting to perform a prohibited action on at least one email of the subset of the plurality of archived emails and performing a protective action; and
wherein the protective action comprises logging the user out of an email account associated with the user and preventing the user from logging back into the email account associated with the user; and automatically sending an email to an administrator in a legal department or an information technology department of a company.

7. The computing device of claim 6, wherein comparing the one or more conditions with the individual archived emails of the plurality of archived emails stored on the computing device comprises:
comparing the one or more conditions with metadata associated with the individual archived emails of the plurality of archived emails stored on the computing device; and
comparing the one or more conditions with multiple fields of the individual archived emails of the plurality of archived emails stored on the computing device, wherein the multiple fields include a sender email address, one or more recipient email addresses, a subject field, and a body field.

8. The computing device of claim 6, the operations further comprising:
creating copies of the subset of the plurality of archived emails;
sending the copies to the email server; and
deleting, from the computing device, the subset of the plurality of archived emails.

9. The method of claim 6, wherein the prohibited action comprises at least one of: delete the at least one email; forward the at least one email; or edit the at least one email.

10. One or more non-transitory computer readable media storing instructions executable by one or more processors to perform operations comprising: receiving, from an email server, an email rule comprising one or more conditions and one or more actions; comparing the one or more conditions with individual archived emails of a plurality of archived emails stored on the computing device; identifying a subset of the plurality of archived emails that satisfy the one or more conditions; restoring the subset of the plurality of archived emails to the email server; and performing the one or more actions on the subset of the plurality of archived emails that were restored to the server, wherein the one or more actions include placing a legal hold on the subset of the plurality of archived emails;
the operations further comprising: determining that a user is attempting to perform a prohibited action on at least one email of the subset of the plurality of archived emails; and performing a protective action; and
wherein the protective action comprises logging the user out of an email account associated with the user and preventing the user from logging back into the email account associated with the user; and automatically sending an email to an administrator in a legal department or an information technology department of a company.

11. The one or more non-transitory computer readable media of claim 10, wherein comparing the one or more conditions with the individual archived emails of the plurality of archived emails stored on the computing device comprises:
comparing the one or more conditions with metadata associated with the individual archived emails of the plurality of archived emails stored on the computing device; and
comparing the one or more conditions with multiple fields of the individual archived emails of the plurality of archived emails stored on the computing device, wherein the multiple fields include a sender email address, one or more recipient email addresses, a subject field, and a body field.

12. The one or more non-transitory computer readable media of claim 10, the operations further comprising:
creating copies of the subset of the plurality of archived emails; and
sending the copies to the email server.

13. The one or more non-transitory computer readable media of claim 10, the operations further comprising:
deleting, from the computing device, the subset of the plurality of archived emails.

14. The method of claim 10, wherein the prohibited action comprises at least one of: delete the at least one email; forward the at least one email; or edit the at least one email.

* * * * *